(12) United States Patent
Li et al.

(10) Patent No.: US 9,900,564 B2
(45) Date of Patent: Feb. 20, 2018

(54) LIGHT SOURCE SYSTEM AND PROJECTION DISPLAY DEVICE

(71) Applicant: APPOTRONICS CHINA CORPORATION, Shenzhen (CN)

(72) Inventors: Yi Li, Shenzhen (CN); Hong Ye, Shenzhen (CN); Zeqin Wang, Shenzhen (CN)

(73) Assignee: APPOTRONICS CORPORATION LIMITED, Shenzhen (CN)

(*) Notice: Subject to any disclaimer, the term of this patent is extended or adjusted under 35 U.S.C. 154(b) by 0 days.

(21) Appl. No.: 15/306,448

(22) PCT Filed: Apr. 24, 2015

(86) PCT No.: PCT/CN2015/077338
§ 371 (c)(1),
(2) Date: Oct. 24, 2016

(87) PCT Pub. No.: WO2015/161821
PCT Pub. Date: Oct. 29, 2015

(65) Prior Publication Data
US 2017/0048501 A1    Feb. 16, 2017

(30) Foreign Application Priority Data

Apr. 24, 2014    (CN) .......................... 2014 1 0169610

(51) Int. Cl.
*H04N 9/31* (2006.01)
*G02B 27/10* (2006.01)
(Continued)

(52) U.S. Cl.
CPC ........... *H04N 9/3105* (2013.01); *G02B 27/10* (2013.01); *G02B 27/2207* (2013.01);
(Continued)

(58) Field of Classification Search
CPC ......... G02B 27/10; F02B 27/22; G03B 21/00; G03B 21/20; H04N 9/31; H04N 13/04
See application file for complete search history.

(56) References Cited

U.S. PATENT DOCUMENTS 5,580,142 A * 12/1996 Kurematsu .......... H04N 9/3105
348/E9.027
6,863,401 B2    3/2005 Penn
(Continued)

FOREIGN PATENT DOCUMENTS

CN    102253581 A    11/2011
CN    102650811 A    8/2012
(Continued)

OTHER PUBLICATIONS

International Search Report in the parent PCT application No. PCT/CN2015/077338, dated Jul. 2, 2015.
(Continued)

*Primary Examiner* — Sultan Chowdhury
*Assistant Examiner* — Danell L Owens
(74) *Attorney, Agent, or Firm* — Chen Yoshimura LLP

(57) ABSTRACT

A light source system and a projection display device comprising the light source system. The light source system comprises at least three light sources (10, 20, 30) used for generating at least two wide-spectrum light beams, a light splitting and combining device (40), and at least two spatial light modulators, i.e. a first spatial light modulator (50) and a second spatial light modulator (60), wherein a first wide-spectrum light beam and a second wide-spectrum light beam generate light with two colors and at least four primary wavelengths after being split by the light splitting and combining device (40), thereby expanding the color gamut range and improving the quality of image display. In addition, using two spatial light modulators to modulate light
(Continued)

simultaneously takes account of the costs of products while guaranteeing the image display quality.

18 Claims, 11 Drawing Sheets

(51) Int. Cl.
  G03B 21/00 (2006.01)
  G03B 21/20 (2006.01)
  G02B 27/22 (2018.01)
  H04N 13/04 (2006.01)
(52) U.S. Cl.
  CPC ........... *G03B 21/00* (2013.01); *G03B 21/005* (2013.01); *G03B 21/20* (2013.01); *G03B 21/204* (2013.01); *G03B 21/2013* (2013.01); *G03B 21/2066* (2013.01); *H04N 9/31* (2013.01); *H04N 13/0422* (2013.01)

(56) References Cited

U.S. PATENT DOCUMENTS

| 8,398,247 | B2 | 3/2013 | Miyazaki |
| 2003/0234911 | A1 | 12/2003 | Horvath |
| 2005/0094104 | A1 | 5/2005 | Ishizaka et al. |
| 2007/0273797 | A1* | 11/2007 | Silverstein ............ G02B 13/22 348/752 |
| 2010/0328626 | A1 | 12/2010 | Miyazaki |
| 2012/0256879 | A1 | 10/2012 | Liu |
| 2012/0300178 | A1* | 11/2012 | Sugiyama ............ H04N 9/3111 353/31 |
| 2013/0155128 | A1 | 6/2013 | Miyazaki |
| 2014/0036164 | A1 | 2/2014 | Narimatsu et al. |
| 2015/0253654 | A1 | 10/2015 | Hu |

FOREIGN PATENT DOCUMENTS

| CN | 102799056 A | 11/2012 |
| CN | 103576435 A | 2/2014 |
| CN | 103713455 A | 4/2014 |
| EP | 2749943 A1 | 7/2014 |
| WO | 2014048287 A1 | 4/2014 |

OTHER PUBLICATIONS

IPRP in the parent PCT application No. PCT/CN2015/077338, dated Oct. 25, 2016.
Chinese Office Action, dated Aug. 1, 2016, in a counterpart Chinese patent application, No. CN 201410169610.4.
Supplementary European Search Report and Written Opinion in counterpart application EP 15782989.6, dated Jan. 24, 2017.

* cited by examiner

LIGHT SOURCE SYSTEM AND PROJECTION DISPLAY DEVICE

BACKGROUND OF THE INVENTION

Field of the Invention

This invention relates to optical display technologies, and in particular, it relates to a light source system and projection display device.

Description of Related Art

In conventional light source systems, spatial light modulators (SLMs) are used to perform spatial modulation of light. Single SLM, two-SLM and three-SLM systems have their respective advantages and are used in various projection display devices. The operation principle of single SLM system is: Multiple primary color lights are alternatingly inputted to the SLM to be modulated; the monochromatic images projected on the screen are switched at high frequency, and the monochromatic images in a time sequence are combined into a color image by the effect of persistence of vision of the human eyes. However, due to the limitations in the switching frequency, a "rainbow" effect may exist. Also, the utilization efficiency of the light source is not high, making it difficult to increase the brightness of the light source system employing single SLM. But because of its low cost, single SLM is widely used in low-end projection display devices. The operation principle of three-SLM system is: Three primary color lights are simultaneously inputted to three independent SLMs to be modulated by them respectively. The monochromatic images are combined to generate a color image. Because it does not use a time sequence of monochromatic lights, the "rainbow" effect is effectively eliminated. Also, the light source does not need to be converted or filtered, which improves the utilization efficiency of the light source. However, because of its high cost, it is typically used in high-end projection display devices, such as in cinemas. To overcome the respective shortcomings of single SLM and three-SLM light source systems, two-SLM devices are developed, where one SLM processes one primary color light, and the other SLM processes two other primary color lights. The outputs of the two SLMs overlap in some time intervals (each processing one primary color light respectively), which increases the switching frequency as compared to the single SLM system, but is less costly than three-SLM system because it uses one fewer SLM. Thus, two-SLM systems are the focus of research in the projection display field.

However, two-SLM systems also have problems that need to be solved. For example, in Chinese patent application No. 201210370655.9, described here with reference to FIG. 1, the system includes an excitation light source 1, a color wheel 2, a light separation and combination device 3, a first SLM 4 and a second SLM 5. The color wheel 2 is divided into two segments each provided with a wavelength conversion material. One of the segments is excited by the excitation light source 1 to generate a first converted light, which is separated by the light separation and combination device 3 into two lights which are respectively inputted to the first SLM 4 and the second SLM 5 to be modulated. The other one of the segments is excited by the excitation light source 1 to generate a second converted light, which is directed by the light separation and combination device 3 to be inputted into the second SLM 5 to be modulated. Compared to a single SLM system, this system can increase the brightness and eliminate rainbow effect, and compared to three-SLM system, it can lower the cost. However, this system still has its shortcomings: By using two SLMs to process the three primary color lights, the color gamut of the displayed image is limited, as a result, the images outputted by the light source system to the display screen are not sufficiently realistic. Further, because a single light source is used to generate the converted light to be sequentially inputted to the SLMs, the SLMs are not fully utilized, so the image brightness is still low and cannot meet the requirement of low cost and high quality products.

Therefore, there is a need for a light source system and projection display device which can solve the high cost and low quality problem of conventional light source systems and projection display devices.

SUMMARY

Embodiments of the present invention provide a light source system and projection display device which can solve the problem of conventional technology i.e. its inability to achieve both low cost and high quality.

In one aspect, this present invention provides a light source system, which includes: a light separation and combination device; at least three light sources, including: a first light source generating a first broad spectrum light; a second light source generating a second broad spectrum light; and a third light source generating a first color light; and at least two spatial light modulators, including a first spatial light modulator and a second spatial light modulator; wherein the light separation and combination device is disposed on a light path of the three light sources, for separating the first broad spectrum light based on wavelength into a second color light traveling along a first channel and a third color light traveling along a second channel, for separating the second broad spectrum light based on wavelength into a fourth color light traveling along the first channel and a fifth color light traveling along the second channel, for directing the third color light, the fifth color light and at least a portion of the first color light along the second channel to the second spatial light modulator, and for directing the second color light and the fourth color light along the first channel to the first spatial light modulator;

wherein the first spatial light modulator sequentially modulates the second color light and the fourth color light; wherein the second spatial light modulator sequentially modulates the third color light, the fifth color light and the portion of the first color light; and wherein a spectrum of the first broad spectrum light and a spectrum of the second broad spectrum light have different ranges.

Preferably, the first light source includes a first excitation light source and a first wavelength conversion device, the first wavelength conversion device including a single segment which has a wavelength conversion material, wherein the first excitation light source generates an excitation light, wherein the wavelength conversion material of the first wavelength conversion device is disposed on a light path of the first excitation light source for absorbing the excitation light to generate the first broad spectrum light, wherein the second light source includes a second excitation light source and a second wavelength conversion device, the second wavelength conversion device including a single segment which has a wavelength conversion material, wherein the second excitation light source generates an excitation light, wherein the wavelength conversion material of the second wavelength conversion device is disposed on a light path of the second excitation light source for absorbing the excitation light to generate the second broad spectrum light.

Preferably, the first excitation light source and the second excitation light source are both solid state semiconductor light emitting devices.

Preferably, the light source system may further include a controller, for controlling the first light source, the second light source, the third light source, the first spatial light modulator and the second spatial light modulator.

Preferably, the controller controls the On and Off of each of the first light source, the second light source and the third light source.

Preferably, the first color light is a broad spectrum light, and wherein the light separation and combination device separates the first color light into a first separated color light traveling along the first channel and a second separated color light traveling along the second channel.

Preferably, the first separated color light and the second separated color light have the same color and different wavelength ranges.

Preferably, the second color light ant the third color light have same color and different wavelength ranges, and the fourth color light ant the fifth color light have same color and different wavelength ranges.

Preferably, the first broad spectrum light, the second broad spectrum light and the first color light are respectively red, green and blue broad spectrum lights.

Preferably, the light source system is adapted for use in a 3D projection display device, wherein the first separated color light, the third color light and the fifth color light are adapted to be viewed with a left eye of a viewer, and the second separated color light, the fourth color light and the sixth color light are adapted to be viewed with a right eye of the viewer.

Preferably, the first broad spectrum light is a cyan light, the second broad spectrum light is a yellow light, and the first color light is a magenta light. The magenta light may be a converted light generated by a red and a blue phosphor.

Preferably, the controller controls the first light source, the second light source and the third light source to turn On and Off sequentially within each period.

Preferably, the first color light is any one of three primary color lights.

Preferably, the third color light ant the fifth color light have same color and different wavelength ranges, or wherein the second color light ant the fourth color light have same color and different wavelength ranges.

Preferably, the controller controls the On and Off of the first light source, the second light source and the third light source within a period, the On time intervals of the first light source, the second light source and the third light source partially overlap without completely overlapping.

Preferably, each of the first light source, the second light source and the third light source is turned On and Off within the period for at least N times, N being a positive integer.

The light source system includes an excitation light source and a wavelength conversion device;

In any of the above systems, the wavelength conversion device includes two segments each containing a respective wavelength conversion material, each wavelength conversion material absorbing the excitation light and generating a broad spectrum light, wherein when the wavelength conversion device moves, the two segments are sequentially disposed on a light path of the excitation light, wherein the excitation light source and a first one of the two segments of the wavelength conversion device form the first light source, and wherein the excitation light source and a second one of the two segments of the wavelength conversion device form the second light source.

In another aspect, the present invention provides a projection display device, which includes any one of the above light source systems.

The above technical schemes use light sources that can generate broad spectrum lights, and use the light separation and combination device to separate the broad spectrum lights, to obtain lights of different dominant wavelengths. This enhances the color gamut. Meanwhile, the lights of different dominant wavelengths are modulated by different spatial light modulators, where two spatial light modulators simultaneously process lights of different dominant wavelengths. This increases the color switching frequency, eliminating "rainbow" effect; and also efficiently utilizes the spatial light modulators, increasing the brightness. At the same time, cost is reduced. Thus, embodiments of the present invention reduce the cost and ensure the quality of the products.

BRIEF DESCRIPTION OF THE DRAWINGS

FIGS. 6-1, 6-2 and 6-3 illustrate the output spectra and color gamut of the second embodiment.

DETAILED DESCRIPTION OF PREFERRED EMBODIMENTS

Embodiments of the present invention are described below with reference to the drawings.

The three primary color lights referred to in this disclosure are red, green and blue lights. A period referred to in this disclosure is the time period for processing a frame of image. The term broad spectrum light as used in this disclosure refers to a light that has a spectral range greater than 10 nm and that can be divided base on wavelength. Here, a light that can be divided base on wavelength may have a continuous spectral range or a discontinuous spectral range. Broad spectrum lights with a continuous spectral range include yellow light, cyan light, etc. Broad spectrum lights with a discontinuous spectral range include magenta light, etc. In this disclosure, lights of the same color but different spectra refer to lights that have similar colors and have partially overlapping spectra, such as greenish red light and red light, reddish green light and green light; such lights have different dominant wavelengths but overlapping spectra.

Figure 2A:
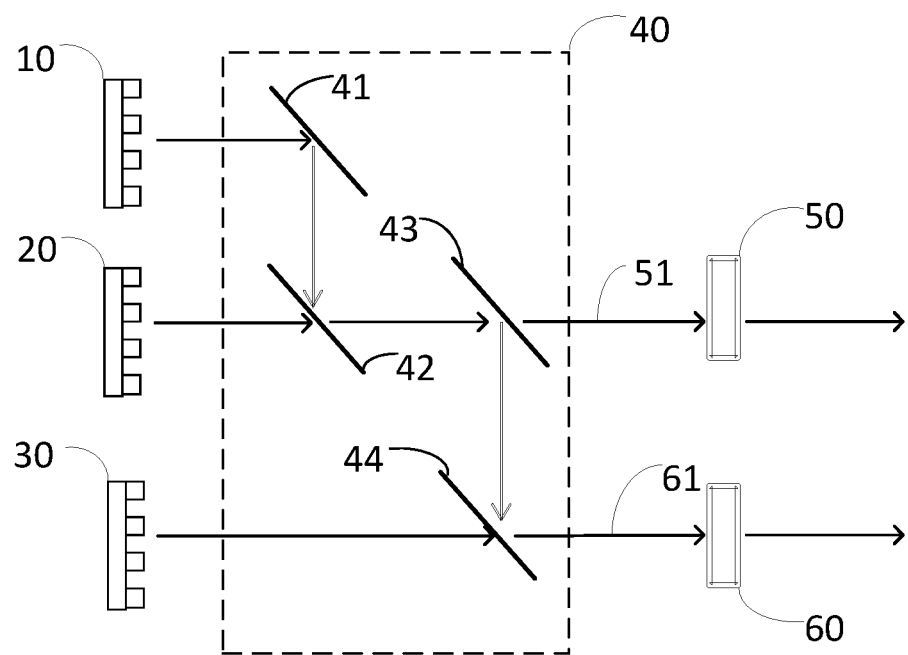
FIGS. 2A and 2B schematically illustrate the structure of a light source system according to a first embodiment of the present invention.
Figure 2B:
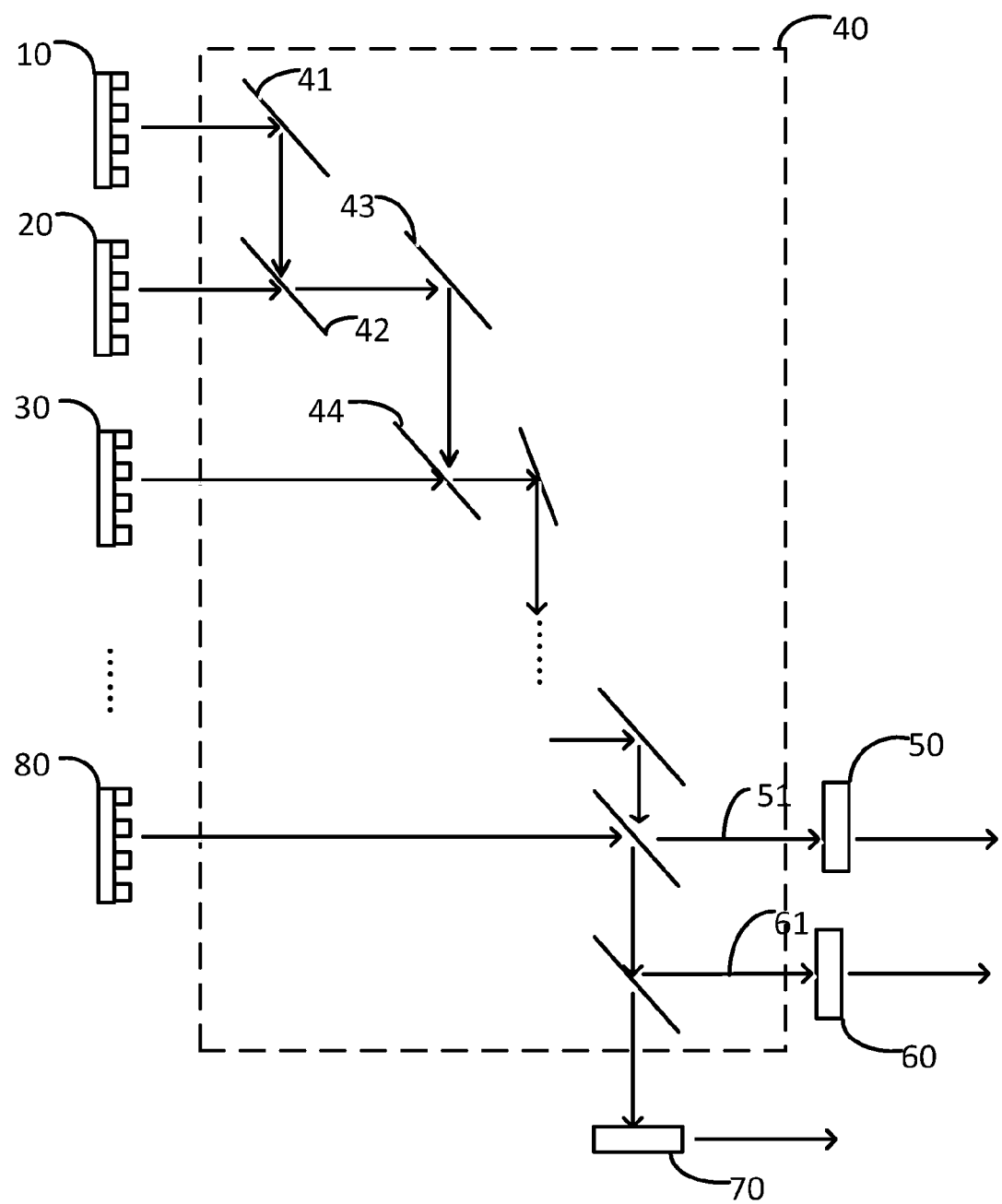

A first embodiment of the present invention provides a light source system, described below with reference to FIGS. 2A and 2B. FIGS. 2A and 2B schematically illustrate the structure of a light source system according to this embodiment. As shown in FIG. 2A, the light source system includes: a first light source 10, a second light source 20, a third light source 30, a light separation and combination device 40, a first spatial light modulator 50 and a second spatial light modulator 60. The light separation and combination device 40 is disposed on the light paths of the first light source 10, the second light source 20 and the third light source 30. The relative positions of the first light source 10, second light source 20 and third light source 30 are not limited. As shown in FIGS. 2A and 2B, the system includes at least three light sources and at least two spatial light modulators; the number of light sources is N≥3; as shown in FIG. 2B, the number of light sources may be 3, 4, 5, 6, . . . . The number of spatial light modulators is M≥2; the number of spatial light modulators may be 2, 3, 4, 5, 6, . . . FIG. 2B only shows an exemplary structure, and does not limit the numbers of the spatial light modulators and the light sources in this invention. When the number of light sources is N>3, the light separation and combination device first directs the light from multiple light sources to a common light path, and then separates the light on that light path. When the number of spatial light modulators is M>2, the light separation and combination device separates the light on a same light path into M channels, and the light in each channel is inputted to one spatial light modulator. In the descriptions below, three light sources and two spatial light modulator are used as examples for convenience of explanation.

The first light source 10 is used to generate a first broad spectrum light. The first broad spectrum light may be light generated by solid state light emitting devices, or light obtained through wavelength conversion, without limitation. The second light source 20 is used to generate a second broad spectrum light. The second broad spectrum light may be light generated by solid state light emitting devices, or light obtained through wavelength conversion, without limitation. The third light source 30 is used to generate a first color light. The first color light may be a broad spectrum light or any one of the three primary color lights. The first color light may be light generated by solid state light emitting devices, or light obtained through wavelength conversion, without limitation. The spectral ranges of the first broad spectrum light and the second broad spectrum light are different; here, different spectral ranges means that the two spectra partially overlap but do not completely overlap. In this embodiment, the first light source 10, the second light source 20 and the third light source 30 are three independent light sources, and their output lights are along different light paths.

The light separation and combination device 40 is used to separate the first broad spectrum light based on wavelength, into a second color light travelling along a first channel and a third color light travelling along a second channel; to separate the second broad spectrum light based on wavelength, into a fourth color light travelling along the first channel and a fifth color light travelling along the second channel; to direct the third color light, the fifth color light and at least a part of the first color light along the second channel to the second spatial light modulator; and to direct the second color light and the fourth color light along the first channel to the first spatial light modulator. By separating the first broad spectrum light and the second broad spectrum light based on wavelength, multiple color lights of different dominant wavelengths can be obtained, which increases the color gamut and makes the image display more realistic. In this embodiment, the light separation and combination device 40 may include a first reflector 41, a first filter plate 42, a second filter plate 43, and a third filter plate 44. The first reflector 41 reflects the first broad spectrum light, the first filter plate reflects the first broad spectrum light and transmits the second broad spectrum light to achieve the light combination of the first broad spectrum light and the second broad spectrum light. The second filter plate 43 transmit a part of the spectral range of the second broad spectrum light and the first broad spectrum light to the first channel 51, and reflects the other spectral range of the second broad spectrum light to the third filter plate 44. The third filter plate 44 directs the first color light and the other spectral range of the second broad spectrum light to travel along the second channel 61 to the second spatial light modulator 60. The light separation and combination device in this embodiment has a simple structure and is easy to assemble.

The first spatial light modulators include the first spatial light modulator 50 and the second spatial light modulator 60. The first spatial light modulator 50 sequentially modulates the second color light and the fourth color light in a time sequence. The second spatial light modulator 60 sequentially modulates the third color light, the fifth color light and at least a part of the first color light in a time sequence. The spatial light modulators in this embodiment may be digital micromirror devices (DMDs), liquid crystal display devices (LCD), or liquid crystal on silicon devices (LCOS), etc.

In the above described embodiment, by separating the broad spectrum lights based on wavelength and directing the resulting separated lights to two spatial light modulators, and using the two spatial light modulators to simultaneously modulate lights of different wavelength ranges, it indirectly increases the color switching frequencies and eliminates the rainbow effects. Further, in this embodiment, by using three light sources, where at least two of them are broad spectrum lights, then by light separating, at least five different color lights are obtained. This increases the color gamut, making the output image more realistic, increasing the image display quality. Moreover, by using two spatial light modulators to simultaneously modulate various color lights, the brightness of the system is improved, so that the cost is reduced while ensuring image quality.

Figure 3:
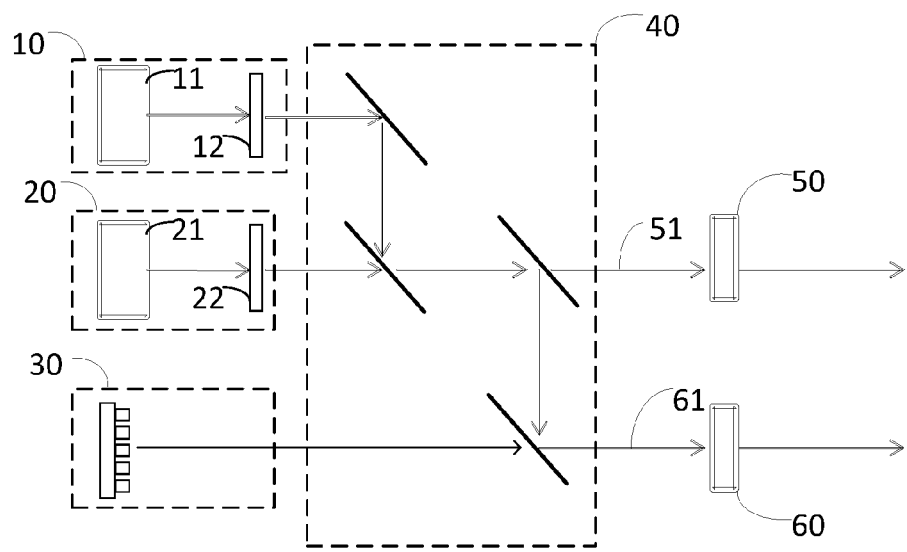
FIG. 3 schematically illustrates the structure of a light source system according to a second embodiment of the present invention.

A second embodiment of the present invention, which is based on the first embodiment, is described below with reference to FIG. 3. FIG. 3 schematically illustrates the structure of a light source system according to this embodiment. The light source system includes the first light source 10, the second light source 20, the third light source 30, the light separation and combination device 40, the first spatial light modulator 50 and the second spatial light modulator 60. The various components are described in more detail below.

Figure 5:
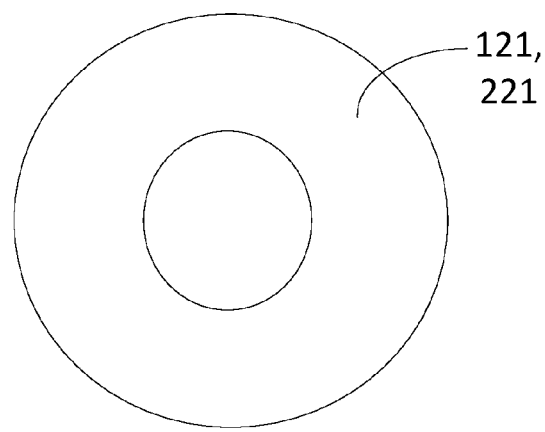
FIG. 5 schematically illustrates the structure of a wavelength conversion device of the second embodiment.

(1) The first light source 10 includes a first excitation light source 11 and a first wavelength conversion device 12. The first excitation light source 11 generates an excitation light, which includes, without limitation, UV or blue light. The first excitation light source 11 includes, without limitation, LEDs or solid state laser light emitting devices. Preferably, the first excitation light source 11 is a laser light source. Laser light sources have small etendue and can reduce light loss; also, the luminance density of light emitted by laser sources is much higher than that from other light sources. The first wavelength conversion device 12 is disposed on the light path of the first excitation light source 11, for absorbing the excitation light to generate the first broad spectrum light. As shown in FIG. 5, the first wavelength conversion device 12 includes a wavelength conversion segment 121, which is provided with a wavelength conversion material. The light spot of the first excitation light source 11 is incident on the wavelength conversion segment 121 of the first wavelength conversion device 12; the wavelength conversion segment 121 absorbs the excitation light to generate a converted light. When the wavelength conversion material is yellow phosphor or green phosphor, the converted light is a yellow or a green broad spectrum light. The wavelength conversion material is not limited; it can be any wavelength conversion material that can be excited by a UV or blue light to generate a converted light having a wavelength range longer than the UV or blue light. In this embodiment, the wavelength conversion segment includes a single segment, which can prevent spoke spot, further improving quality of the light source system. In this embodiment, the first wavelength conversion device 12 may include a drive device, for driving the first wavelength conversion device 12 to move, so that the wavelength conversion material of the wavelength conversion segment is sequentially disposed on the light path of the excitation light. This can effectively prevent concentration of heat on small areas of the wavelength conversion segment. The first wavelength conversion device 12 may also be stationary, where the wavelength conversion region is slightly larger than the excitation light spot. Such a first wavelength conversion device 12 has a simpler structure.

(2) The second light source 20 includes a second excitation light source 21 and a second wavelength conversion device 22. The second excitation light source 21 generates an excitation light, which includes, without limitation, UV or blue light. The second excitation light source 21 includes, without limitation, LED or solid state laser light emitting devices. Preferably, the second excitation light source 21 is a laser light source. Laser light sources have small etendue and can reduce light loss; also, the luminance density of light emitted by laser sources is much higher than that from other light sources. The second wavelength conversion device 22 is disposed on the light path of the second excitation light source 21, for absorbing the excitation light to generate the second broad spectrum light. As shown in FIG. 5, the second wavelength conversion device 22 includes a wavelength conversion segment 221, which is provided with a wavelength conversion material. The light spot of the second excitation light source 21 is incident on wavelength conversion segment 221 of the second wavelength conversion device 22; the wavelength conversion segment 221 absorbs the excitation light to generate a converted light. When the wavelength conversion material is cyan phosphor or red phosphor, the converted light is a cyan or yellow broad spectrum light. The wavelength conversion material is not limited; it can be any wavelength conversion material that can be excited by UV or blue light to generate a converted light having a wavelength range longer than the UV or blue light. In this embodiment, the second wavelength conversion device 22 may include a drive device, for driving the second wavelength conversion device 22 to move, so that the wavelength conversion material of the wavelength conversion segment is sequentially disposed on the light path of the excitation light. This can effectively prevent concentration of heat on small areas of the wavelength conversion segment. The second wavelength conversion device 22 may also be stationary, where the wavelength conversion region is slightly larger than the excitation light spot. Such a second wavelength conversion device 22 has a simpler structure.

The wavelength conversion devices of the above two light sources both include a single segment, which can prevent spoke spot, making the output light more uniform.

(3) The third light source 30 generates a first color light, which may be any one of the three primary color lights. The third light source 30 only needs to meet the following: the lights obtained by separating the first broad spectrum light and second first broad spectrum light, along with the first color light, provide all three primary color lights.

Figure 1:
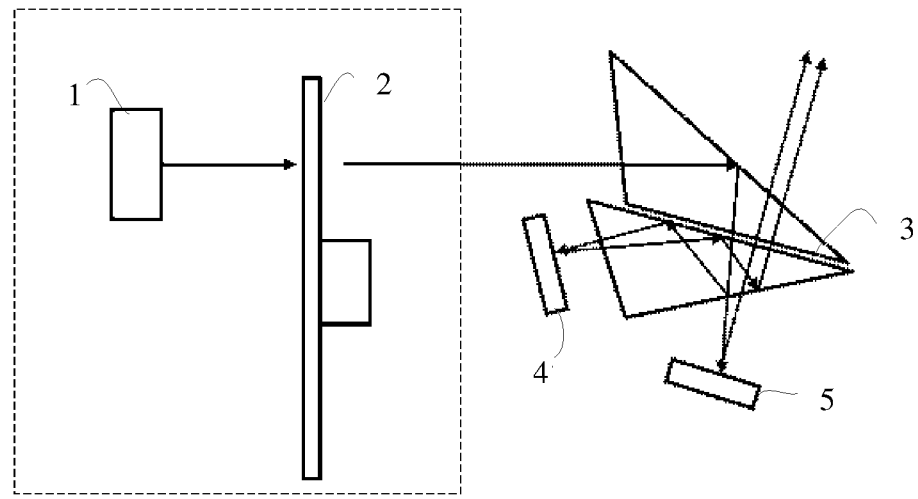
FIG. 1 schematically illustrates the structure of a conventional light source system.
Figures 1, 6:
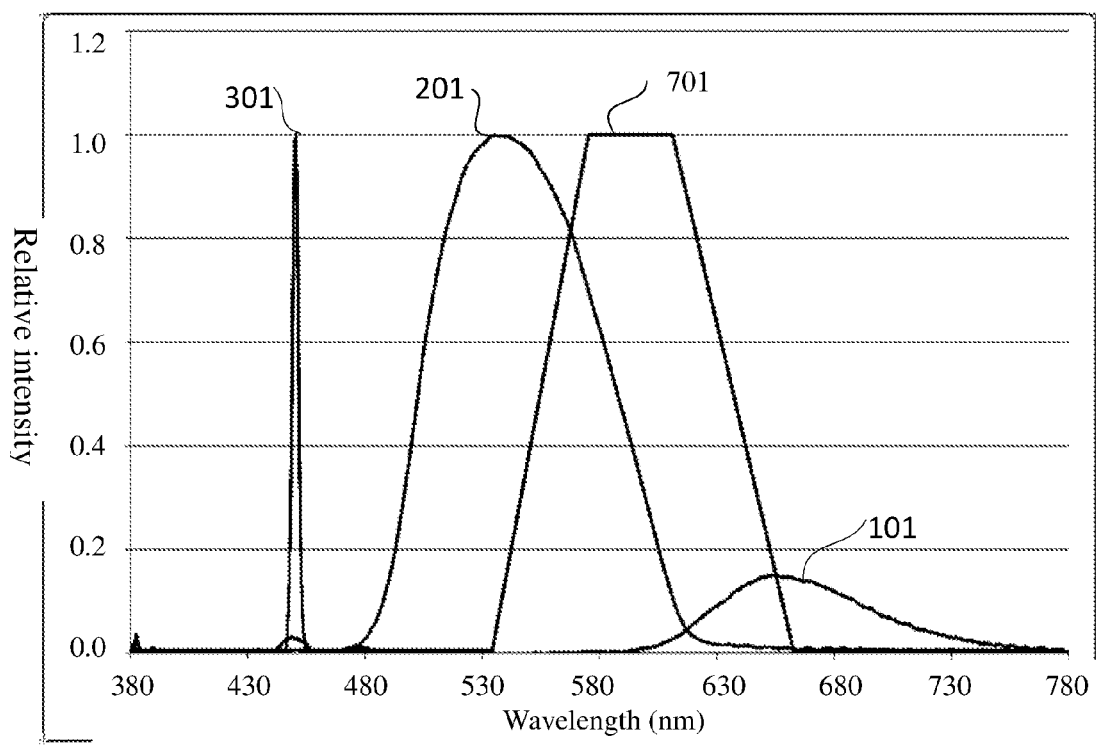
Figures 2, 6:
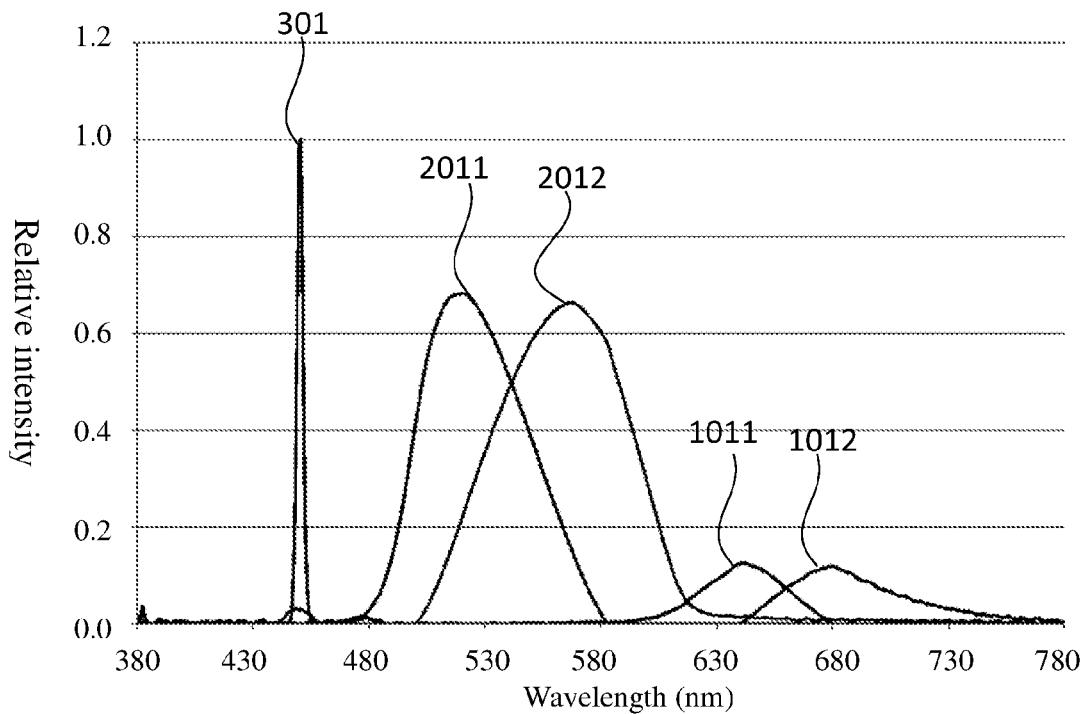
Figures 3, 6:
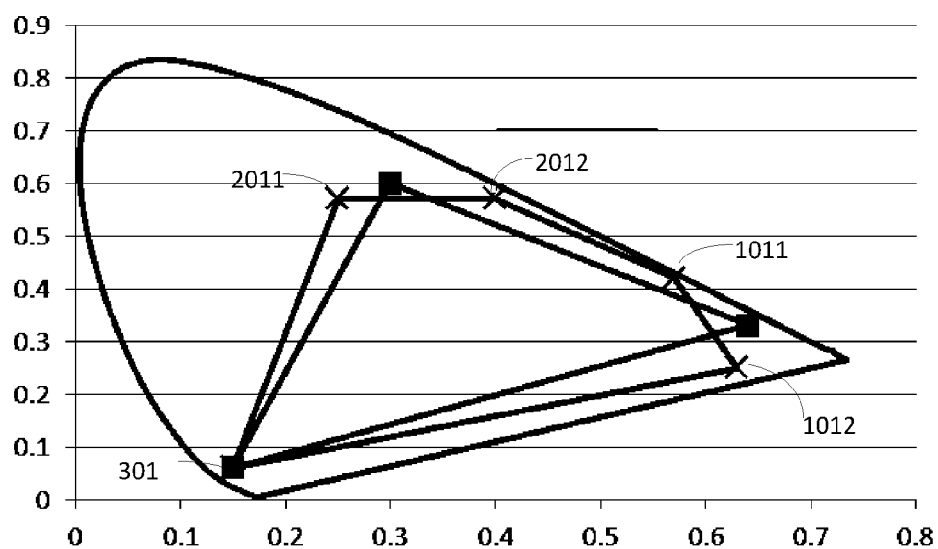

In this embodiment, the three light sources generate three lights, and after light separation and combination, five color lights are obtained. As shown in FIG. 6-1, the spectra of the lights from the three light sources are respectively a red light 101, a yellow light 201 and a blue light 301, where the red light 101 and the yellow light 201 are broad spectrum lights, and blue light 301 is one of the three primary color lights. After the light separation and combination device 40, five primary colors are obtained. The filtering characteristics of the light separation and combination device 40 of this embodiment are shown as the filter curve 701 in FIG. 6-1. After the light separating using the filter curve 701, the five primary color lights obtained are a first red light 1012, a second red light 1011, a first green light 2012, a second green light 2011 and a blue light 301, as shown in FIG. 6-2. The color gamut of the five primary lights is shown in FIG. 6-3. The color gamut area surrounded by points 301, 2011, 2012, 1012, and 1011 is larger than the color gamut obtained by the three primary colors in conventional technologies (the area surrounded by the three points in FIG. 6-3). In other words, the system of this embodiment enlarges the color gamut, so that the displayed image formed in this embodiment is more realistic than the image formed by the three primary color lights.

Figure 4:
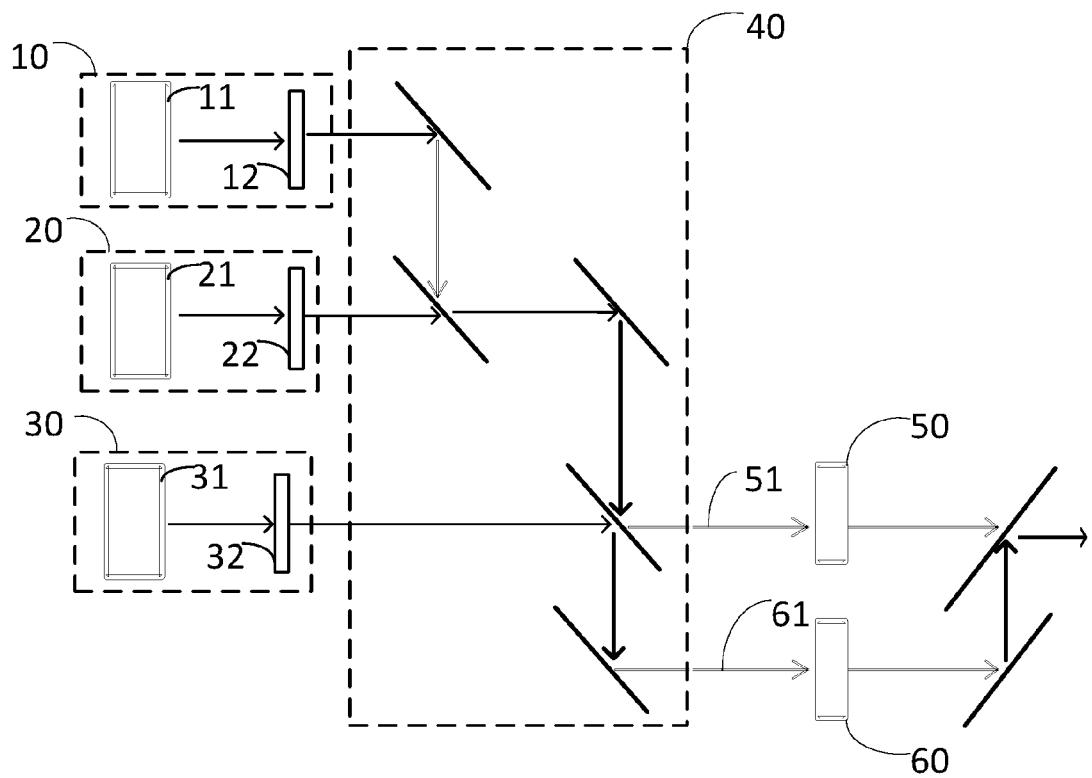
FIG. 4 schematically illustrates the structure of a light source system according to a third embodiment of the present invention.

A third embodiment of the present invention, which is based on the first embodiment, is described below with reference to FIG. 4. FIG. 4 schematically illustrates the structure of a light source system according to this embodiment. The light source system includes the first light source 10, the second light source 20, the third light source 30, the light separation and combination device 40, the first spatial light modulator 50 and the second spatial light modulator 60. The various components are described in more detail below. Here, the first light source 10 and the second light source 20 are similar or identical to the first light source and second light source of the second embodiment and will not be described in detail. Only the third light source 30 and the light separation and combination device 40 are described below.

The third light source 30 generates a first color light, which is a broad spectrum light. The broad spectrum light is separated by the light separation and combination device 40, to generate a first separated color light and a second separated color light. The light separation and combination device 40 directs the first separated color light and the second separated color light to be respectively inputted into the first spatial light modulator 50 and the second spatial light modulator 60 to be modulated. The third light source 30 may include a third excitation light source 31 and a third wavelength conversion device 32. The third excitation light source 31 generates an excitation light, which includes, without limitation, UV or blue light. The third excitation light source 31 includes, without limitation, LED or solid state laser light emitting devices. Preferably, the third excitation light source 31 is a laser light source. Laser light sources have small etendue and can reduce light loss; also, the luminance density of light emitted by laser sources is much higher than that from other light sources. The third wavelength conversion device 32 is disposed on the light path of the third excitation light source 31, for absorbing the excitation light to generate the first color light. The third wavelength conversion device 32 includes a wavelength conversion segment, which is provided with a wavelength conversion material. The light spot of the third excitation light source is incident on wavelength conversion segment of the third wavelength conversion device 32; the wavelength conversion segment absorbs the excitation light to generate a converted light. Preferably, the third wavelength conversion device 32 includes a single wavelength conversion segment. The wavelength conversion material is not limited; it can be any wavelength conversion material that can be excited by UV or blue light to generate a converted light having a wavelength range longer than the UV or blue light, so that the first broad spectrum light, the second broad spectrum light and the first color light, after separation by the light separation and combination device, can generate six color lights. For example, the output light of the first light source may be a yellow light, the output light of the second light source may be a cyan light, and the output light of the third light source may be a magenta light; or, the output light of the first light source may be a blue broad spectrum light, the output light of the second light source may be a green broad spectrum light, and the output light of the third light source may be a red broad spectrum light. In this embodiment, the light separation and combination device 40 first combines the first broad spectrum light and the second broad spectrum light; and then the combined light, together with the first color light, is separated by a TIR (total internal reflection) prism and Philips prism, into two channels. The first spatial light modulator 50 modulates the light in the first channel for, and the second spatial light modulator 60 modulates the light in the second channel. Of course, the third light source in this embodiment may also be at least one LED, which can generate a broad spectrum light i.e. the first color light. The third light source may also be a laser array, which can generate a continuous spectrum light, i.e. it can generate a broad spectrum light. In this embodiment, using the LED or laser array as the third light source can simplify the system structure because a wavelength conversion device is not needed.

In this embodiment, the three broad spectrum lights are separated, to respectively obtain a first red light, a second red light, a first green light, a second green light, a first blue light and a second blue light. The first red light and the second red light are lights with similar color but different dominant wavelengths; the first green light and the second green light are lights with similar color and overlapping spectra but different dominant wavelengths; the first blue light and the second blue light are lights with similar color and overlapping spectra but different dominant wavelengths; i.e., they are lights of the same color but different spectra.) The first red light, the first green light and the first blue light enter one channel to be inputted into one spatial light modulator, and the second red light, the second green light and the second blue light enter another channel to be inputted into another spatial light modulator. These lights are respectively modulated by the two spatial light modulators to obtain the output image. The two spatial light modulators may receive the same image data, so they can output the same image. This light source system may be used in 3D projection display devices; the image from the first spatial light modulator can be viewed with the left eye of the viewer and the image from the second spatial light modulator can be viewed with the right eye of the viewer, to realize 3D projection display. Or, this light source system may be used in a dual-screen display devices, which is not described in detail here.

Figure 7:
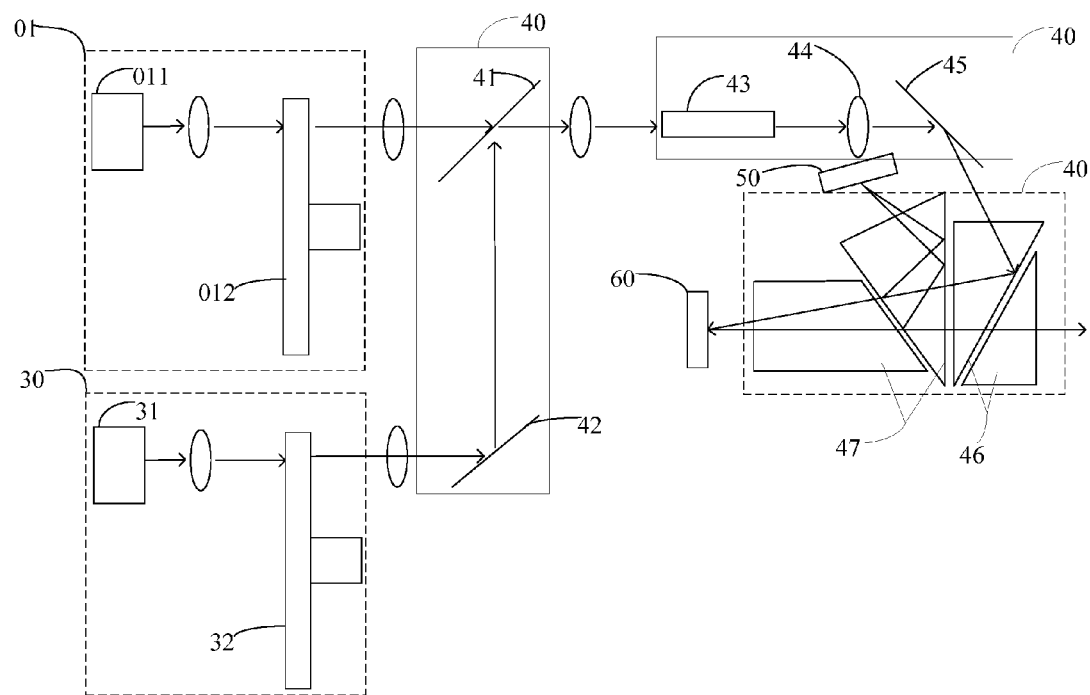
FIG. 7 schematically illustrates the structure of a light source system according to a fourth embodiment of the present invention.
Figure 8:
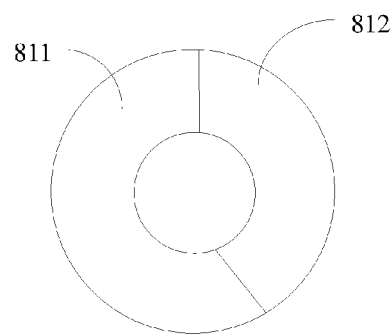
FIG. 8 schematically illustrates the structure of a wavelength conversion device of the fourth embodiment.

A fourth embodiment of the present invention is described with reference to FIG. 7. FIG. 7 schematically illustrates the structure of a light source system according to this embodiment. The light source 01 includes a first excitation light source 011 and a first wavelength conversion device 012. The first excitation light source 011 generates an excitation light, which includes, without limitation, UV or blue light. As shown in FIG. 8, the wavelength conversion device 012 includes two segments, where segment 811 is provided with one wavelength conversion material, and segment 812 is provided with another wavelength conversion material. The wavelength conversion materials of segments 811 and 812 are different, but they can both be excited to generate two respective broad spectrum lights, forming the first light source and the second light source. The first light source and the second light source in this embodiment are not independent; their output lights are in the same light path. The light sources in this embodiment may produce spoke spot, but its structure is simpler, and because the first wavelength conversion device 012 moves, the first light source and the second light source form a time sequence of output light. The third light source 30 may include a third excitation light source 31 and a third wavelength conversion device 32, the third wavelength conversion device 32 including a phosphor material which forms a wavelength conversion layer. The third wavelength conversion device 32 may also include a scattering layer, located between the wavelength conversion layer and a substrate (the substrate carries the wavelength conversion material), or located the side of the wavelength conversion layer that faces the excitation light source 31. The third excitation light source 31 includes, without limitation, blue or UV light source. The wavelength conversion layer may include red phosphor, green phosphor, cyan phosphor, or yellow phosphor, etc. The third light source 30 may alternatively include a light source 31 and a scattering device 32, the scattering device 32 being located on the light path of the light source 31 to scatter the light from the light source 31. This can make the output light more uniform, and reduce speckles. The light source 31 may be a blue, green or red light source. Light from the light source 31 can be directly used, which increases the brightness of the light source.

In this embodiment, the segment 811 and segment 812 use different wavelength conversion materials, which may be yellow phosphor, cyan phosphor, etc. The converted light generated by segment 811 and segment 812 when excited by the excitation light have a different spectral coverage than the output light of the third light source 30. After light separation, at least three color lights are obtained, and the three color lights have at least four lights of different dominance wavelengths.

The output light of the third light source is reflected by the reflector 42 to impinge on the dichroic element 41. The dichroic element 41 transmits the light from the first light source and the second light source, and reflects the light from the third light source. This way, the lights from the first, second and third light sources are combined into one beam (referred to here as triple-combined light). The triple-combined light is collimated by a collimating element 43, then reflected by the second reflector 45, to enter the TIR prism.

It is reflected by the TIR prism to enter the Philips prism 47, and separated by the Philips prism 47 to obtain two channels of light which are respectively inputted to the first and second spatial light modulators.

In the above first to fourth embodiments, collimating elements may be provided between the excitation light source or the light source and the wavelength conversion device. The collimating element collimates the light from the excitation light source or the light source down to a smaller light spot onto the wavelength conversion device. In the above embodiments, any one or more of the first, second and third light sources may be light generated by mixed solid state light emitting devices; for example, one of the light sources may be light emitted by an LED array or by a laser array emitting different colors. Although the spatial uniformity of the light produced by such a system is not as good as that of a system of the above embodiments where the three light sources are broad spectrum light generated by phosphors, its structure is simpler.

Figure 9:
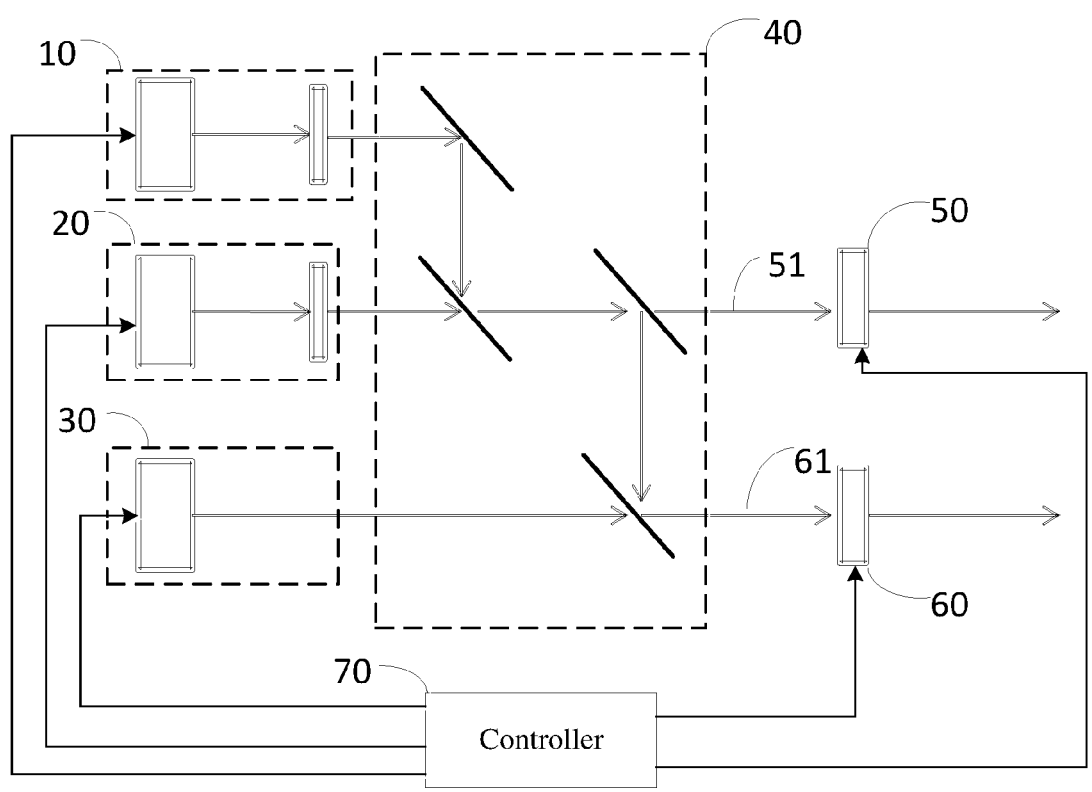
FIG. 9 schematically illustrates the structure of a light source system according to a fifth embodiment of the present invention.

A fifth embodiment is based on the above four embodiments, as shown in FIG. 9. The light source system of this embodiment further includes a controller 70, for controlling all of the light sources and all of the spatial light modulators. In this embodiment, for ease of illustration, the system of FIG. 9 having three light sources and two spatial light modulators is described here. The controller 70 controls the first light source, the second light source and the third light source, as well as the first spatial light modulator 50 and the second spatial light modulator 60. More specifically, the controller 70 controls the On/Off of the first, second and third light sources. When the first light source and second light source are both generated from the same excitation light, the controller 70 controls the On/Off of that excitation light source and the third light source. The controller 70 receives the image data, converts the data to desired format, and forwards the data respectively to the two spatial light modulators. The spatial light modulators are driven to modulate the input light to change light amount to generate an output light. When the spatial light modulators are driven, the controller 70 sends drive signal to the light sources to drive the On/Off of the light sources.

In this embodiment, when the first light source and the second light source are both generated by the same wavelength conversion device illuminated by the excitation light, the first light source and the second light source are a time sequence of lights, so only the On/Off of the excitation light source needs to be controlled. This situation is not described in further detail. Below, the situation where the first light source and the second light source are independent light sources is described.

Figure 10:
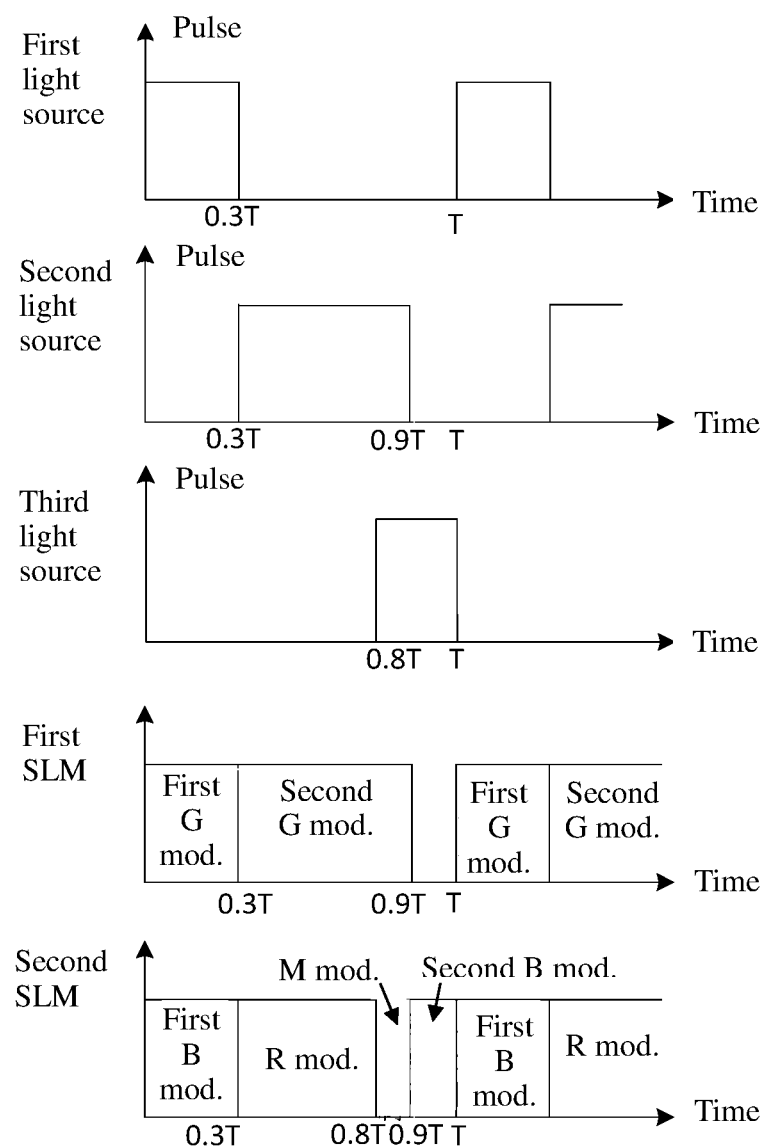
FIG. 10 is a timing diagram of the modulation of the spatial light modulators of the fifth embodiment.

The controller 70 may be used to control the On/Off of the first light source 10, the second light source 20 and the third light source 30 within the same period. The On time intervals of the first light source 10, the second light source 20 and the third light source 30 partially overlap but do not completely overlap. FIG. 10 is a timing diagram of the control in this embodiment. The first light source is turned On during the first 0.3 T time interval, the second light source is turned On during the 0.3 T-0.9 T time interval, and the third light source is turned On during the 0.8 T-1 T time interval. Thus, during the 0.8 T-0.9 T time interval, both the second light source and the third light source are turned On; during this time interval, the first spatial light modulator 50 modulates green light during 0.8 T-0.9 T, and the second spatial light modulator 60 modulates yellow light during the same time interval. The yellow light is a combination of red and green, so this modulation mode can increase the output brightness of the spatial light modulators. This modulation mode effectively adds a yellow primary color light, which enlarges the color gamut and increase the output brightness. Further, because the two spatial light modulators simultaneously modulate lights, it further increases the output brightness of the light source system.

Figure 11:
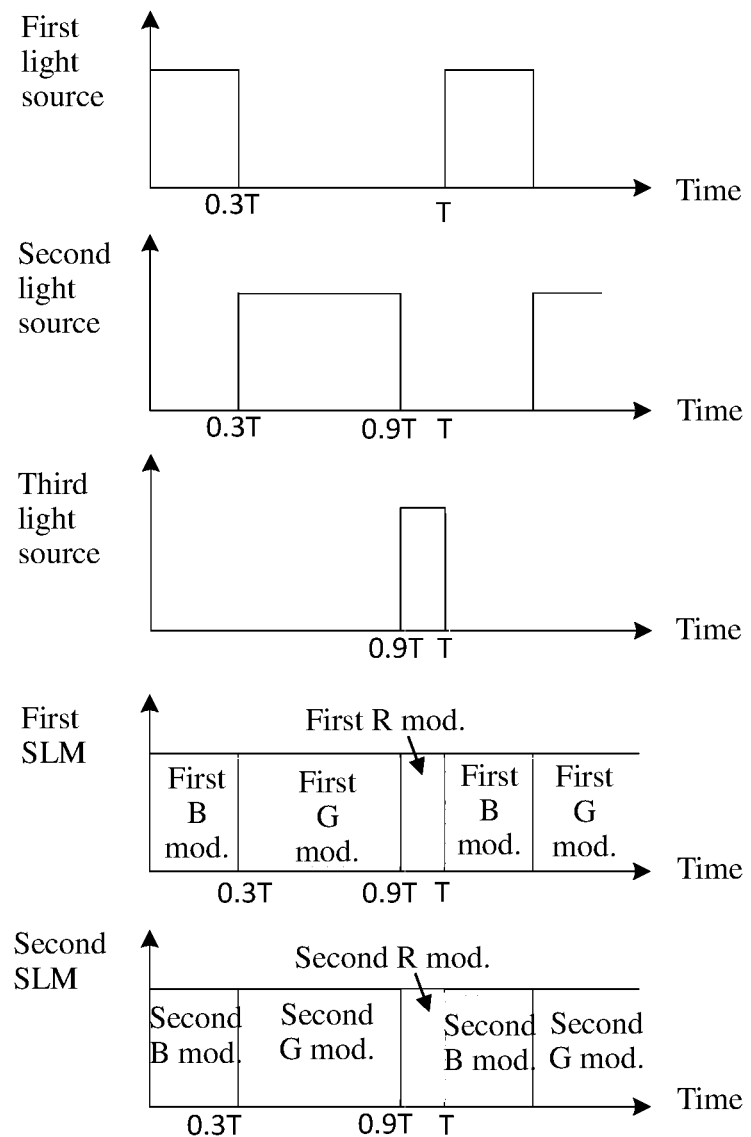
FIG. 11 is another timing diagram of the modulation of the spatial light modulators of the fifth embodiment.

The controller can also be used to control the first light source, the second light source and the third light source to sequentially turn On and Off within one period. As shown in FIG. 11, within a period, during the first 0.3 T, the first light source is controlled to turn On and the other light sources are Off; during 0.3 T-0.9 T, the second light source is controlled to turn On and the other light sources are Off; and during 0.9 T-1 T, the third light source is controlled to turn On and the other light sources are Off. In the following examples, the output of the first light source is a blue broad spectrum light, the output of the second light source is a green broad spectrum light, and the output of the third light source is a red broad spectrum light. The light separation and combination device separates the blue broad spectrum light into a first blue light and a second blue light; the first blue light travels along the first channel to be inputted to the first spatial light modulator, and the second blue light travels along the second channel to be inputted to the second spatial light modulator. The controller controls the first spatial light modulator to modulate the first blue light to output a blue light in accordance with the video or image data, and controls the second spatial light modulator to modulate the second blue light to output a blue light in accordance with the same video or image data. The modulations of the green broad spectrum light and the red broad spectrum light are similar to the modulation of the blue broad spectrum light and not described in detail here. This modulation mode enlarges the color gamut and increases output brightness. Further, because both spatial light modulators are fully utilized (without and idle time), it further increase the output brightness of the light source system.

In the above embodiment, the controller 70 can also control the first light source, the second light source and the third light source to each turn On/Off N times within one period (where N is a positive integer). This can increase the switching frequency of the light source, i.e. increase the color switching frequency, effectively eliminating the "rainbow" effect.

Figure 12:
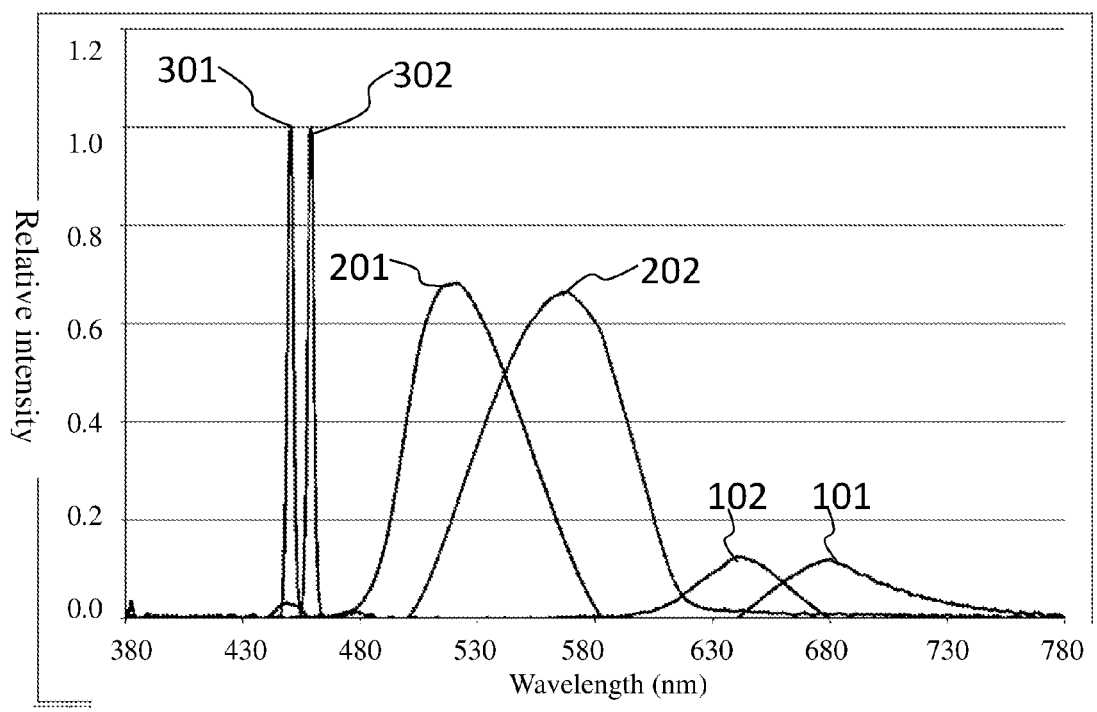
FIG. 12 shows the spectral coverage of the output in the fifth embodiment.

In the above embodiment, when the lights generated by the three light sources are all broad spectrum lights, as shown in FIG. 12, after the light separation and combination device, six color lights can be generated. The six color lights may include lights of similar color but different dominant wavelengths. For example, greenish red light and red light are both red colors; their spectra partially overlap but have different dominant wavelengths (i.e. they are lights of the same color but different spectra). As another example, blueish green light and reddish green light are both green colors; their spectra partially overlap but have different dominant wavelengths. Using these six primary color lights, inputting three of them into one spatial light modulator and inputting the other three into the other spatial light modulator, 3D projection can be realized. Or, using the six color lights at the same time in a non-3D projection device can significantly enlarge the color gamut and improve the quality of the projection.

Figure 13:
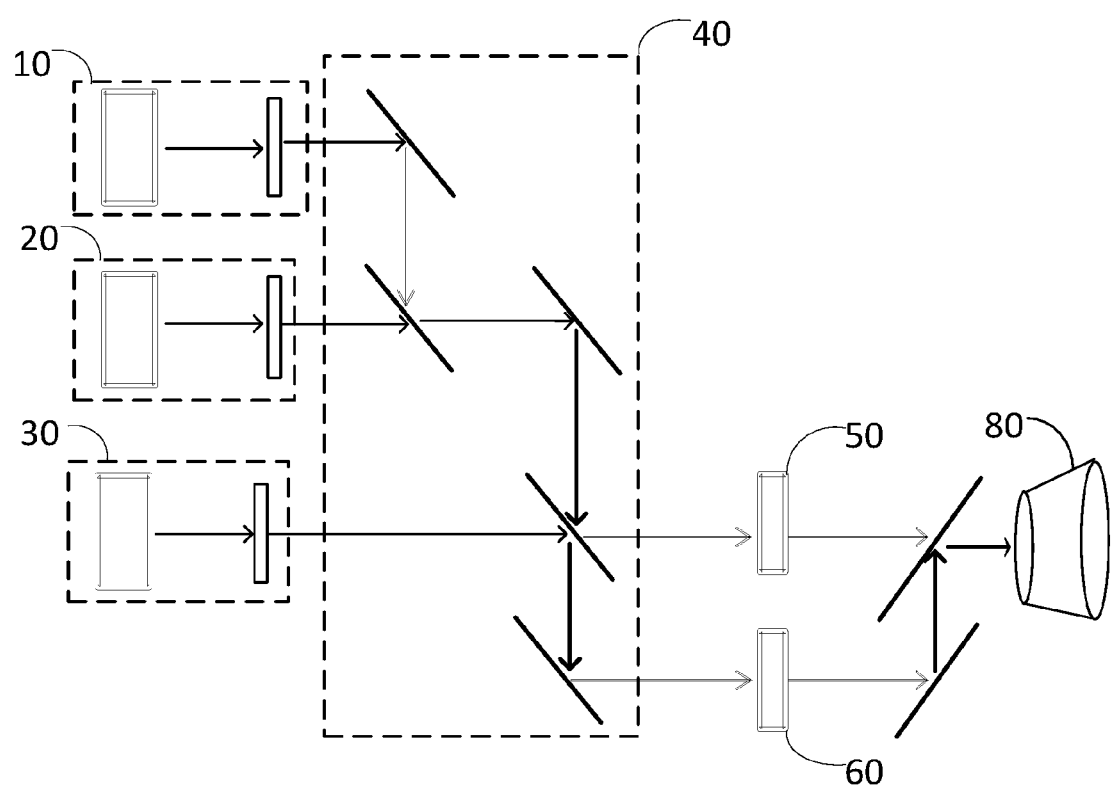
FIG. 13 schematically illustrates the structure of a light source system according to a sixth embodiment of the present invention.

A sixth embodiment is provided, which is based on the above five embodiments. This embodiment includes a projection display device which uses a light source system of in any one of the above five embodiments. Refer to FIG. 13, the projection display device includes the first light source 10, the second light source 20, the third light source 30, the light separation and combination device 40, the first spatial light modulator 50, the second spatial light modulator 60, the controller (not shown in FIG. 13), and a projection prism 80. The lights of the first light source 10, second light source 20 and third light source 30 are separated by the light separation and combination device 40 to be inputted respectively to the first spatial light modulator 50 and the second spatial light modulator 60. The controller controls the first spatial light modulator 50 and the second spatial light modulator 60 to modulate their respective input lights to output lights carrying the image. The lights carrying the image is combined by another light separation and combination device and then inputted to the projection display prism 80 which projects the light carrying the image.

In this embodiment, the first light source and second light source are broad spectrum lights, and the third light source may be either a broad spectrum light or any one of the three primary color lights. After separation by the light separation and combination device 40, at least five lights with different dominant wavelengths are obtained, which enlarges the color gamut. Also, by using two spatial light modulators, the cost of the product is reduced while improving the color gamut.

It will be apparent to those skilled in the art that various modification and variations can be made in the light source and projection system and related methods of the present invention without departing from the spirit or scope of the invention. Thus, it is intended that the present invention cover modifications and variations that come within the scope of the appended claims and their equivalents.

What is claimed is:

1. A light source system, comprising:
a light separation and combination device;
at least three light sources, including:
a first light source generating a first broad spectrum light;
a second light source generating a second broad spectrum light; and
a third light source generating a first color light; and
at least two spatial light modulators, including a first spatial light modulator and a second spatial light modulator;
wherein the light separation and combination device is disposed on a light path of the three light sources, for separating the first broad spectrum light based on wavelength into a second color light traveling along a first channel and a third color light traveling along a second channel, for separating the second broad spectrum light based on wavelength into a fourth color light traveling along the first channel and a fifth color light traveling along the second channel, for directing the third color light, the fifth color light and at least a portion of the first color light along the second channel to the second spatial light modulator, and for directing the second color light and the fourth color light along the first channel to the first spatial light modulator;
wherein the first spatial light modulator sequentially modulates the second color light and the fourth color light;
wherein the second spatial light modulator sequentially modulates the third color light, the fifth color light and the portion of the first color light; and
wherein a spectrum of the first broad spectrum light and a spectrum of the second broad spectrum light have different ranges.

2. The light source system of claim 1,
wherein the first light source includes a first excitation light source and a first wavelength conversion device, the first wavelength conversion device including a single segment which has a wavelength conversion material,
wherein the first excitation light source generates an excitation light,
wherein the wavelength conversion material of the first wavelength conversion device is disposed on a light path of the first excitation light source for absorbing the excitation light to generate the first broad spectrum light,
wherein the second light source includes a second excitation light source and a second wavelength conversion device, the second wavelength conversion device including a single segment which has a wavelength conversion material, and
wherein the second excitation light source generates an excitation light,
wherein the wavelength conversion material of the second wavelength conversion device is disposed on a light path of the second excitation light source for absorbing the excitation light to generate the second broad spectrum light.

3. The light source system of claim 2, wherein the first excitation light source and the second excitation light source are both solid state semiconductor light emitting devices.

4. The light source system of claim 1, further comprising a controller, for controlling the at least three light sources and the at least two spatial light modulators.

5. The light source system of claim 4, wherein the controller controls the On and Off of each of the first light source, the second light source and the third light source.

6. The light source system of claim 5, wherein the first color light is a broad spectrum light, and wherein the light separation and combination device separates the first color light into a first separated color light traveling along the first channel and a second separated color light traveling along the second channel.

7. The light source system of claim 6, wherein the first separated color light and the second separated color light have the same color and different wavelength ranges.

8. The light source system of claim 7, wherein the second color light ant the third color light have same color and different wavelength ranges, and the fourth color light ant the fifth color light have same color and different wavelength ranges.

9. The light source system of claim 8, wherein the first broad spectrum light, the second broad spectrum light and the first color light are respectively red, green and blue broad spectrum lights.

10. The light source system of claim 9, wherein the light source system is adapted for use in a 3D projection display device, wherein the first separated color light, the third color light and the fifth color light are adapted to be viewed with a left eye of a viewer, and the second separated color light, the fourth color light and the sixth color light are adapted to be viewed with a right eye of the viewer.

11. The light source system of claim 6, wherein the first broad spectrum light is a cyan light, the second broad spectrum light is a yellow light, and the first color light is a magenta light.

12. The light source system of claim 6, wherein the controller controls the first light source, the second light source and the third light source to turn On and Off sequentially within each period.

13. The light source system of claim 5, wherein the first color light is any one of three primary color lights.

14. The light source system of claim 13, wherein the third color light ant the fifth color light have same color and different wavelength ranges, or wherein the second color light ant the fourth color light have same color and different wavelength ranges.

15. The light source system of claim 13, wherein the controller controls the On and Off of the first light source, the second light source and the third light source within a period, the On time intervals of the first light source, the second light source and the third light source partially overlap without completely overlapping.

16. The light source system of claim 5, wherein each of the first light source, the second light source and the third light source is turned On and Off within the period for at least N times, N being a positive integer.

17. The light source system of claim 1, wherein the system comprises an excitation light source and a wavelength conversion device,
wherein the wavelength conversion device includes two segments each containing a respective wavelength conversion material, each wavelength conversion material absorbing the excitation light and generating a broad spectrum light, wherein when the wavelength conversion device moves, the two segments are sequentially disposed on a light path of the excitation light,
wherein the excitation light source and a first one of the two segments of the wavelength conversion device form the first light source, and
wherein the excitation light source and a second one of the two segments of the wavelength conversion device form the second light source.

18. A projection display device, comprising the light source system of claim 1.

* * * * *